(12) United States Patent
Mrini et al.

(10) Patent No.: US 11,544,456 B2
(45) Date of Patent: Jan. 3, 2023

(54) INTERPRETABLE LABEL-ATTENTIVE ENCODER-DECODER PARSER

(71) Applicant: ADOBE INC., San Jose, CA (US)

(72) Inventors: Khalil Mrini, La Jolla, CA (US); Walter Chang, San Jose, CA (US); Trung Bui, San Jose, CA (US); Quan Tran, San Jose, CA (US); Franck Dernoncourt, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 304 days.

(21) Appl. No.: 16/810,345

(22) Filed: Mar. 5, 2020

(65) Prior Publication Data

US 2021/0279414 A1 Sep. 9, 2021

(51) Int. Cl.
*G06F 40/211* (2020.01)
*G06N 3/04* (2006.01)
*G06N 3/08* (2006.01)

(52) U.S. Cl.
CPC ......... *G06F 40/211* (2020.01); *G06N 3/0454* (2013.01); *G06N 3/0481* (2013.01); *G06N 3/088* (2013.01)

(58) Field of Classification Search
CPC .... G06F 40/211; G06F 40/216; G06F 40/284; G06F 40/289; G06N 3/0454; G06N 3/0481; G06N 3/088; G06N 3/08; G10L 15/02; G10L 15/04; G10L 15/08
See application file for complete search history.

(56) References Cited

U.S. PATENT DOCUMENTS

| 8,825,466 B1* | 9/2014 | Wang | G06F 40/45 704/7 |
| 2008/0221878 A1* | 9/2008 | Collobert | G06F 40/30 704/232 |
| 2010/0005081 A1* | 1/2010 | Bennett | G10L 15/22 704/9 |

(Continued)

OTHER PUBLICATIONS

Bahdanau, et al. "Neural Machine Translation By Jointly Learning to Align and Translate", published as a conference paper at ICLR 2015, arXiv:1409.0473v7 [cs.CL] May 19, 2016, pp. 1-15.

(Continued)

*Primary Examiner* — Michael N Opsasnick
(74) *Attorney, Agent, or Firm* — F. Chau & Associates, LLC

(57) ABSTRACT

Systems and methods for parsing natural language sentences using an artificial neural network (ANN) are described. Embodiments of the described systems and methods may generate a plurality of word representation matrices for an input sentence, wherein each of the word representation matrices is based on an input matrix of word vectors, a query vector, a matrix of key vectors, and a matrix of value vectors, and wherein a number of the word representation matrices is based on a number of syntactic categories, compress each of the plurality of word representation matrices to produce a plurality of compressed word representation matrices, concatenate the plurality of compressed word representation matrices to produce an output matrix of word vectors, and identify at least one word from the input sentence corresponding to a syntactic category based on the output matrix of word vectors.

20 Claims, 13 Drawing Sheets

(56) References Cited

U.S. PATENT DOCUMENTS

| | | | | |
|---|---|---|---|---|
| 2015/0039299 | A1* | 2/2015 | Weinstein | G10L 15/16 |
| | | | | 704/202 |
| 2015/0287405 | A1* | 10/2015 | Biadsy | G10L 15/063 |
| | | | | 704/257 |
| 2017/0192958 | A1* | 7/2017 | Misra | G06F 40/30 |
| 2019/0228099 | A1* | 7/2019 | Bajaj | G06F 16/3329 |
| 2020/0151396 | A1* | 5/2020 | DeFelice | G06F 40/211 |
| 2020/0265196 | A1* | 8/2020 | Ravi | G06F 40/44 |
| 2020/0321002 | A1* | 10/2020 | Shin | G06N 3/0454 |
| 2021/0049236 | A1* | 2/2021 | Nguyen | G06F 40/205 |
| 2021/0142127 | A1* | 5/2021 | Lee | G06N 3/0454 |

OTHER PUBLICATIONS

Chen, et al., "Enhanced LSTM for Natural Language Inference", arXiv:1609.06038v3 [cs.CL] Apr. 26, 2017, 12 pages.

Cui, et al., "Hierarchically-Refined Label Attention Network for Sequence Labeling", Proceedings of the 2019 Conference on Empirical Methods in Natural Language Processing and the 9th International Joint Conference on Natural Language Processing, Hong Kong, Nov. 3-7, 2919, pp. 4115-4128.

Devlin, et al., "BERT: Pre-Training of Deep Bidirectional Transformers for Language Understanding", arXiv:1810.04805v2 [cs.CL] May 24, 2019, 16 pages.

Dozat, et al., "Deep Biaffine Attention for Neural Dependency Parsing", published as a conference paper at ICLR 2017, arXiv:1611.01734v3 [cs.CL] Mar. 10, 2017, 8 pages.

Gaddy, et al., "Whats Going On in Neural Constituency Parsers? An Analysis", Proceedings of NAACL-HLT 2018, New Orleans, Louisiana, Jun. 1-6, 2018, pp. 999-1010.

Jain, et al., "Attention is Not Explanation", Proceedings of NAACL-HLT, Minneapolis, Minnesota, Jun. 2-Jun. 7, 2019, pp. 3543-3556.

Kasami, "An Efficient Recognition and Syntax-Analysis Algorithm for Context-Free Languages", Coordinated Science Laboratory, University of Illinois, Urbana, Illinois, Report R-257, Mar. 1966, 56 pages.

Kitaev, et al. "Constituency Parsing With a Self-Attentive Encoder", Proceedings of the 56th Annual Meeting of the Association for Computational Linguistics (Long Papers), Melbourne, Australia, Jul. 15-20, 2018, pp. 2676-2686.

Lin, et al., "A Structured Self-Attentive Sentence Embedding", Montreal Institute for Learning Algorithms, arXiv:1703.03130v1 [cs.CL] Mar. 9, 2017, 15 pages.

Liu, "Fine-Tune Bert for Extractive Summarization", Institute for Language, Cognition and Computation School of Informatics, University of Edinburgh, arXiv:1903.10318v2 [cs.CL] Sep. 5, 2019, 6 pages.

Luong, et al. "Effective Approaches to Attention-Based Neural Machine Translation", Computer Science Department, Stanford University, Stanford, CA, arXiv:1508.04025v5 [cs.CL] Sep. 20, 2015, 11 pages.

Marcus, et al., "Building a Large Annotated Corpus of English: The Penn Treebank", Department of Computer and Information Sciences, University of Pennsylvania, Philadelphia, PA, pp. 313-330.

Pollard, et al., "Head-Driven Phrase Structure Grammar", ResearchGate, Jul. 2002, 9 pages.

Rikters, "Impact of Corpora Quality on Neural Machine Translation", arXiv:1810.08392v1 [cs.CL] Oct. 19, 2018, 8 pages.

Rikters, et al., "Training and Adapting Multilingual NMT for Less-Resourced and Morphologically Rich Languages", pp. 3766-3733.

Salton, et al., "Attentive Language Models", Proceedings of the 8th International Joint Conference on Natural Language Processing, Taipei, Taiwan, Nov. 27-Dec. 1, 2017, pp. 441-450.

Serrano, et al., "Is Attention Interpretable?", Paul G. Allen School of Computer Science & Engineering, University of Washington, Seattle, WA, arXiv:1906.03731v1 [cs.CL] Jun. 9, 2019, 21 pages.

Stern, et al., "A Minimal Span-Based Neural Constituency Parser", Proceedings of the 55th Annual Meeting of the Association of Computational Linguistics, Vancouver, Canada, Jul. 30-Aug. 4, 2017, pp. 818-827.

Strubell, et al., Linguistically-Informed Self-Attention for Semantic Role Labeling, College of Information and Computer Sciences, University of Massachusetts Amherst, arXiv:1804.08199v3 [cs.CL] Nov. 12, 2018, 14 pages.

Toutanova, et al., "Feature-Rich Part-of-Speech Tagging With a Cyclic Dependency Network", Proceedings of HLT-NAACL 2003 Main Papers, Edmonton, May-Jun. 2003, pp. 173-180.

Vaswani, et al., "Attention is All You Need", 31st Conference on Neural Information Processing Systems, NIPS (2017), Long Beach, CA, USA, arXiv:1706.03762v6 [cs.CL] Dec. 6, 2017, 15 pages.

Wiegreffe, et al., "Attention is Not Not Explanation", Proceedings of the 2019 Conference on Empirical Methods in Natural Language Processing and the 9th International Joint Conference on Natural Language Processing, Hong Kong, China, Nov. 3-7, 2019, pp. 11-20.

Xiao, et al., "Label-Specific Document Representation for Multi-Label Text Classification". Proceedings of the 2019 Conference on Empirical Methods in Natural Language Processing and the 6th International Joint Conference on Natural Language Processings, Hong Kong, China, Nov. 3-7, 2019, pp. 466-475.

Yang, et al., "XLNET: Generalized Autoregressive Pretraining for Language Understanding", 33rd Conference on Neural Information Processing Systems, (NeuriPS 2019), Vancouver, Canada, arXiv:1906.08237v2 [cs.CL] Jan. 2, 2020, 18 pages.

Yang, et al., "Hierarchical Attention Networks for Document Classification", Proceedings of NAACL-HLT 2016, San Diego, California, Jun. 12-17, 2016, pp. 1480-1489.

Younger, "Recognition and Parsing of Context-Free Languages in Time N3*", Information and Control 10, (1967), 189-208.

Zhou, et al., "Head-Driven Phrase Structure Grammar Parsing on Penn Treebank", Department of Computer Science and Engineering, Key Lab of Shanghai Education Commission, Shanghai, China, arXiv:1907.02684v3 [cs.CL] Sep. 10, 2019, 13 pages.

* cited by examiner

INTERPRETABLE LABEL-ATTENTIVE ENCODER-DECODER PARSER

BACKGROUND

The following relates generally to natural language processing, and more specifically to parsing natural language sentences using an artificial neural network (ANN).

Natural language processing (NLP) refers to techniques for using computers to interpret natural language. A variety of machine learning techniques have been developed to aid in NLP tasks. Some examples of machine learning NLP models include attention or self-attention layers. In machine learning, an attention model refers to a model in which the output depends on different parts of the input to varying degrees. In other words, different parts of the input are weighted differently with respect to how much they impact the output. In a self-attention model, the input itself is used to determine where the attention is applied. Many attention models use multiple attention heads, each of which attends to different parts of the input independently.

In some cases, a self-attention model may provide insight into how the model works based on which parts of the input are important for determining different elements of the output. However, the multiple self-attention heads may provide incoherent information about which parts of the input are attended to. Therefore, there is a need in the art for machine learning models in which the attention weights are more readily interpretable.

SUMMARY

A method for parsing natural language sentences using an artificial neural network (ANN) is described. Embodiments of the method may generate a plurality of word representation matrices for an input sentence, wherein each of the word representation matrices is based on an input matrix of word vectors, a query vector, a matrix of key vectors, and a matrix of value vectors, and wherein a number of the word representation matrices is based on a number of syntactic categories, compress each of the plurality of word representation matrices to produce a plurality of compressed word representation matrices, concatenate the plurality of compressed word representation matrices to produce an output matrix of word vectors, and identify at least one word from the input sentence corresponding to a syntactic category based on the output matrix of word vectors; and generating annotation information for the input sentence based on identifying the at least one word corresponding to the syntactic category.

A system for parsing natural language sentences is described. Embodiments of the system may include an encoder comprising a label attention layer configured to produce an output matrix of word vectors based on an input matrix of word vectors using a number of label attention heads corresponding to a number of syntactic categories, wherein each of the label attention heads produces a word representation matrix based on the input matrix of word vectors, a query vector, a matrix of key vectors, and a matrix of value vectors and a decoder configured to identify at least one span of words of an input sentence corresponding to a syntactic category based on the output matrix of word vectors.

A method for training an ANN is described. Embodiments of the method may generate a word representation matrix for each of a plurality of label attention heads, wherein each of the word representation matrices is based on an input matrix of word vectors, a query vector, a label-specific key matrix, and a label-specific value matrix, and wherein a number of the label attention heads is based on a number of syntactic categories, compress each of the word representation matrices to produce a plurality of compressed word representation matrices, concatenate the compressed word representation matrices to produce an output matrix of word vectors, compute a loss value based at least in part on the output matrix of word vectors, and update the label-specific key matrix and the label-specific value matrix based on the loss value.

DETAILED DESCRIPTION

Figure 1:
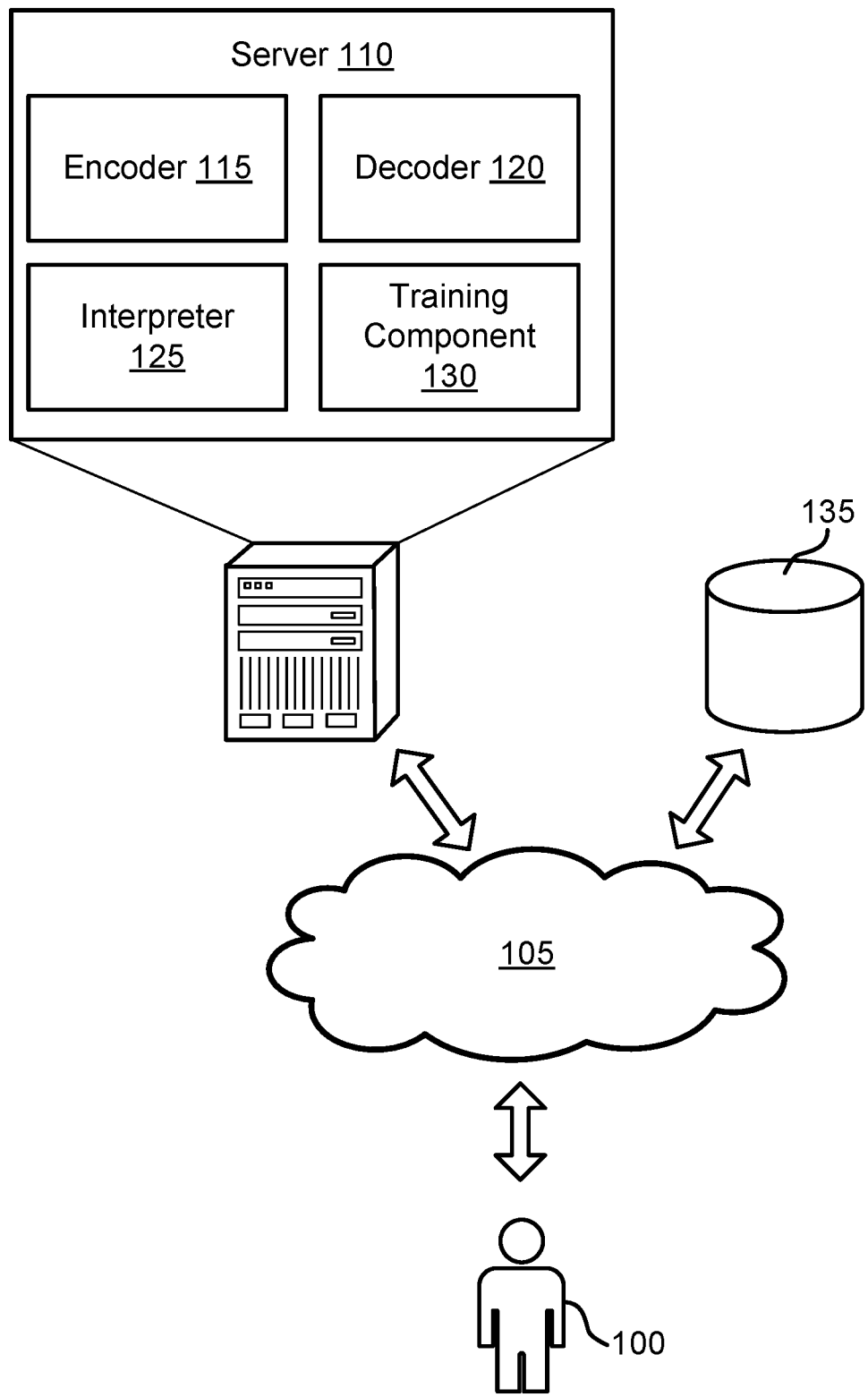
FIG. 1 shows an example of a system for natural language processing (NLP) according to aspects of the present disclosure.

The present disclosure describes systems and methods for natural language processing (NLP) using an interpretable label-attention model. Attention models are commonly used to aid in NLP tasks. In an attention model, the output depends on different parts of the input to varying degrees. That is, the categorization or translation of each word may depend on different words of the input according to different attention weights. In a self-attention model, the input itself is used to determine where the attention is applied.

Using an attention or a self-attention model can provide meaningful interpretation information about how a result is obtained. Specifically, a self-attention model may provide insight into how the model works because the model parameters provide an indication of which parts of the input are important for determining different elements of the output. However, attention models typically use multiple attention heads (i.e., neural network pathways), each of which attends to different parts of the input independently. Different self-attention heads may provide incoherent information about which parts of the input are relevant. Furthermore, the contribution from each attention head may be combined in a way that makes interpretation difficult or impossible.

For example, the attention weights that result from training each self-attention head may be analyzed to provide a heatmap showing which parts of the input are relevant for determining each part of the output. Consider an NLP task involving the assignment of grammatical or syntactic categories to words in a sentence (i.e., noun phrase, verb phrase, preposition, etc.). If the input phrase is "the clerk types a report", the category of the word "types" depends on the context. In a different context, such as for the phrase "there are many types of art", the syntactic category of the word "types" is different.

In a conventional self-attention model, one attention head may show that to determine the function of the word "types" in the first instance, more attention is given to the word "clerk". However, another attention head may pay more attention to the word "report." In many cases, each attention head captures something important about the context of the word, but the combination of weights from different attention heads may be difficult to interpret.

Thus, the present disclosure describes a "label attention model" in which the attention heads correspond to the labels used for different syntactic categories being assigned. For example, there may be one attention head for each label. In some cases, the correspondence between labels and attention heads may emerge during training, rather than being predetermined.

Due to the correspondence between the category labels and the attention heads, the meaning of the attention information can be more readily interpreted. Thus, a label attention head that determines whether the word "types" corresponds to the "noun phrase" category may pay attention to different parts of the input than a label attention head that determines whether the word corresponds to the "verb phrase" category.

For example, the label attention head that determines whether the word "types" corresponds to the "noun phrase" category in the sentence "there are many types of art" may attend more to the word "many" because words following the word "many" are often a part of a noun phrase. However, a different label attention head that determines whether the word "types" corresponds to the "verb phrase" category in that sentence may attend more to the words "there" and "are" because it is rare for a verb phrase to follow these words.

According to at least some embodiments, each label attention head may indicate a probability that each word corresponds to a particular syntactic category. Identifying a correspondence between label attention heads and labels, and maintaining separability of the information from different attention heads enables interpreting the model in a more coherent way.

The following terms are used throughout the present disclosure:

The term "label attention model" refers to a type of attention model that includes a label attention layer in which the number of label attention heads is based on the number of label categories, and where the label attention heads are trained and connected in a way that facilitates correspondence between each label and one or more heads. Each attention head represents a label providing for the model to learn label-specific views of the input sentence, and may incorporate learned parameters including a label-specific query vector, key matrix, and value matrix. A self-attention mechanism propagates information between the words of a sentence. Each resulting word representation contains an attention-weighted view of the sentence. However, including each label's attention-weighted view of the sentence may enhance the word representation on top of the information obtained from self-attention. Thus, a label attention layer may be viewed as a modified form of self-attention, where one query vector is used per attention head.

The terms "query vector," "matrix of key vectors," and "matrix of value vectors" may refer to learned parameters of a label attention head, which correspond to the query, key, and value vectors in a self-attention model. However, unlike in a conventional self-attention model, the query vector is a vector (as opposed to a matrix), and is not multiplied by the input vector. The query vector and the matrix of key vectors may be multiplied to produce the attention vector (as opposed to an attention matrix), which is then multiplied by the matrix of value vectors.

The term "word representation matrix" refers to an intermediate product of a label attention head. Each word representation matrix includes a number of word representation vectors corresponding to each word in an input sentence. In some cases, a word representation matrix may be compressed into a reduced number of dimensions compared to an input matrix (e.g., using a neural network layer). This matrix compression may be performed prior to combining the word representation matrices of different label attention heads so as to retain the ability to differentiate the output of each label attention head in the output of the label attention layer.

The terms "constituency parsing" and "dependency parsing" refer to applications of a label attention model (i.e., tasks a label attention model may perform). Constituency parsing refers extracting the syntactic structure of a sentence according to a phrase structure grammar. Dependency parsing refers to extracting a structure including head words, and words that modify those head words.

System Overview

FIG. 1 shows an example of a system for NLP according to aspects of the present disclosure. The example shown includes user 100, network 105, server 110, and database 135. A user may provide a query in the form of an input sentence to the server 110 via network 105. In response to the query, the server 110 may provide annotation information for the input sentence, such as constituency parsing information, dependency parsing information, or other NLP information.

The server 110 includes a label attention model, which may be an artificial neural network (ANN) trained using data stored in a database 135. An ANN is a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Specifically, the server 110 may include encoder 115, decoder 120, interpreter 125, and training component 130. In some cases, the encoder 115 and decoder 120 are trained simultaneously.

Encoder 115 identifies a set of labels corresponding to the syntactic categories. Encoder 115 includes a label attention layer with multiple label attention heads configured to produce an output matrix of word vectors based on an input matrix of word vectors. Each label attention head represents one or more labels. A query vector is used as a query rather than a matrix to reduce the number of learned parameters per attention head. The label attention heads learn relations between the syntactic categories by computing contributions from each attention head to span vectors.

In some examples, the encoder 115 includes additional layers, where the output of each layer prior to the final layer is provided as the input for a subsequent layer, and where the label attention layer is the final layer. For example, the encoder 115 may have self-attention layers preceding the label attention layer. The number of self-attention layers may vary. Attention partitioning may provide for separating content embeddings from position embeddings increases performance. In some cases, input sentences may be pre-processed (i.e., using a word embedding function). Syntax trees may be represented using a simplified Head-driven Phrase Structure Grammar (HPSG). A division span and a joint span may be considered span representations.

Each label attention head of the encoder 115 generates a word representation matrix, where each of the word representation matrices is based on an input matrix of word vectors, a query vector, a label-specific key matrix, and a label-specific value matrix. Encoder 115 may be an example of, or include aspects of, the corresponding element described with reference to FIG. 8.

Decoder 120 identifies a span of words from an input sentence corresponding to one or more of the syntactic categories based on the output matrix of the encoder. In some examples, the decoder 120 may incorporate a CKY parsing algorithm. In some cases, decoder 120 applies a softmax function to determine a likelihood of each word corresponding to a syntactic category.

Interpreter 125 generates label interpretation information based on a correspondence between the labels and the label attention heads, where the label interpretation information indicates the significance of each word of the input sentence for identifying the span of words corresponding to each syntactic category.

Training component 130 trains the label attention model (i.e., encoder 115 and decoder 120) using the annotated training data in database 135. For example, training component 130 may compute a loss value based on the annotation information generated by the label attention model. Training component 130 may then update parameters of the query vectors, label-specific key matrices, and the label-specific value matrices of each label attention head based on the loss value.

Figure 2:
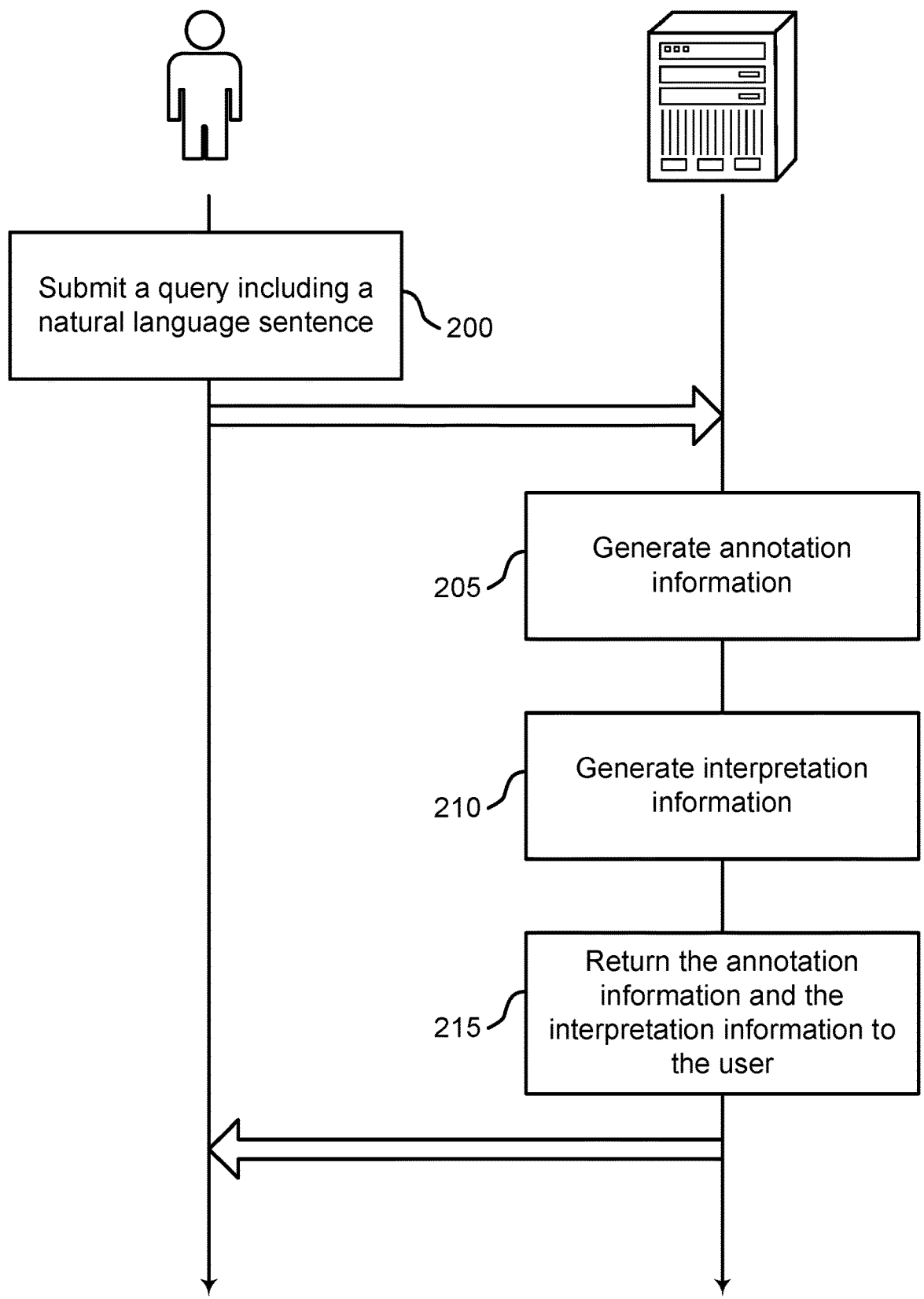
FIG. 2 shows an example of a process for NLP according to aspects of the present disclosure.

FIG. 2 shows an example of a process for NLP according to aspects of the present disclosure. Specifically, the process illustrated in FIG. 2 shows an overview of the interaction between a user 100 and the server 110 described with reference to FIG. 1.

At operation 200, the user 100 submits a query including a natural language sentence. At operation 205, the server 110 generates annotation information. For example, the server may generate constituency parsing and dependency parsing information. At operation 210, the server 110 also generates interpretation information. For example, the interpretation information may indicate which parts of the input contribute to determining different labels for the annotation information. At operation 215, the server 110 returns the annotation information and the interpretation information to the user 100.

Constituency Parsing and Dependency Parsing

Figure 3:
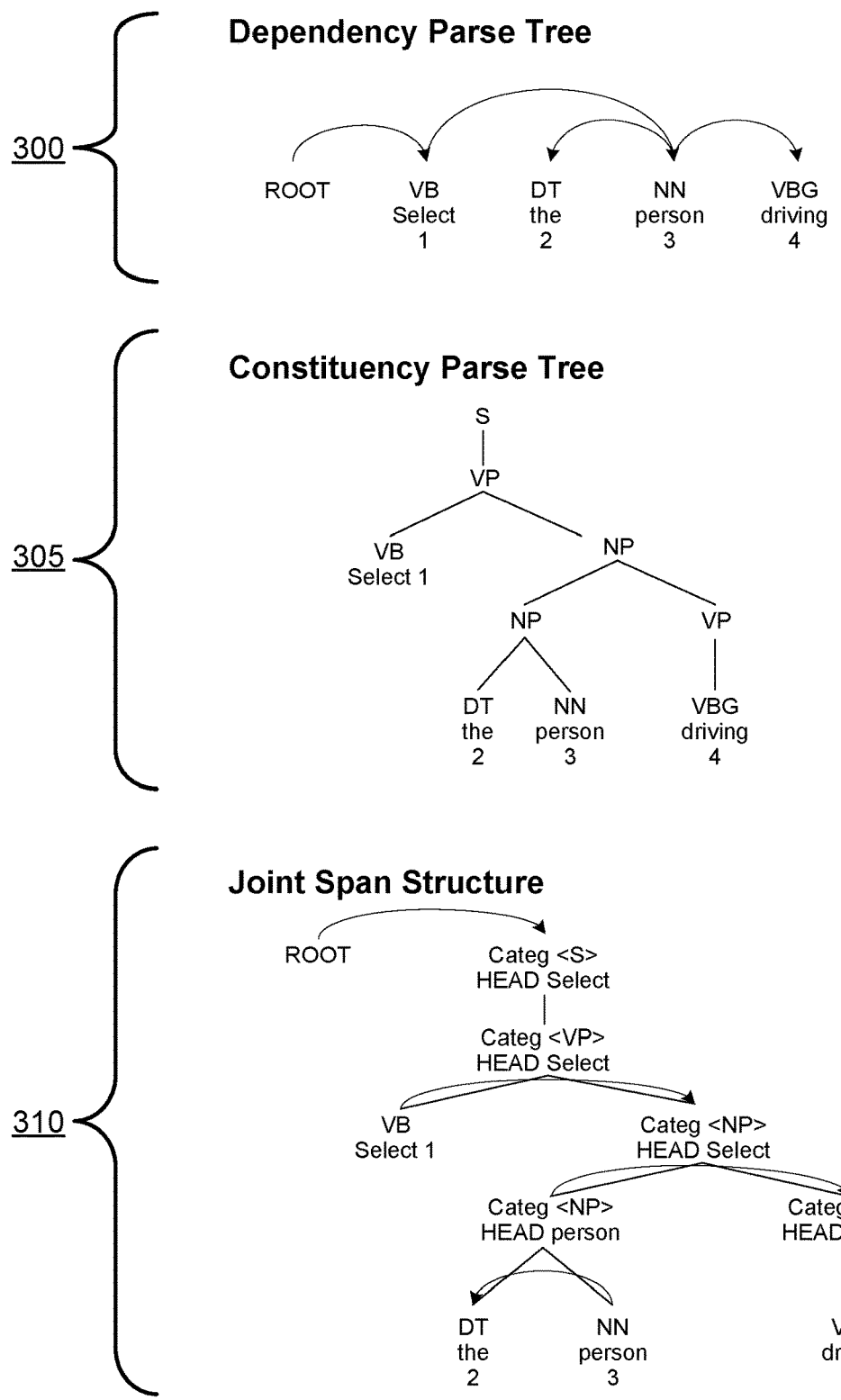
FIG. 3 shows an example of a sentence parsing structure according to aspects of the present disclosure.

FIG. 3 shows an example of a sentence parsing structure according to aspects of the present disclosure. The example shown includes dependency parse tree 300, constituency parse tree 305, and joint span structure 310. The example shown illustrates constituency parsing and dependency parsing for the phrase "select the person driving." In some cases, a label attention model may be configured to provide annotation information including constituency parsing information, dependency parsing information, or both.

Dependency parse tree 300 shows the dependency of each word in the phrase. Also shown are part-of-speech tags including verb (VB), determiner (DT), noun (NN) and gerund (VBG). Each arrow of the dependency parse tree 300 runs from a modified word to a modifier word. So, for example, since the word "driving" modifies the word "person", and arrow is drawn from the word "person" to the word "driving."

Constituency parse tree 305 shows the phrase organized according to whether each word is an element of a structural category including sentence (S), verb phrase (VP), or noun phrase (NP). Note that one phrase may include several other phrases of the same or different type. For example, the phrase "the person driving" is a noun phrase that includes the noun phrase "the person" and the verb phrase "driving."

Joint span structure 310 represents a combination of constituency parsing information and dependency parsing information.

Label Attention Model

Figure 4:
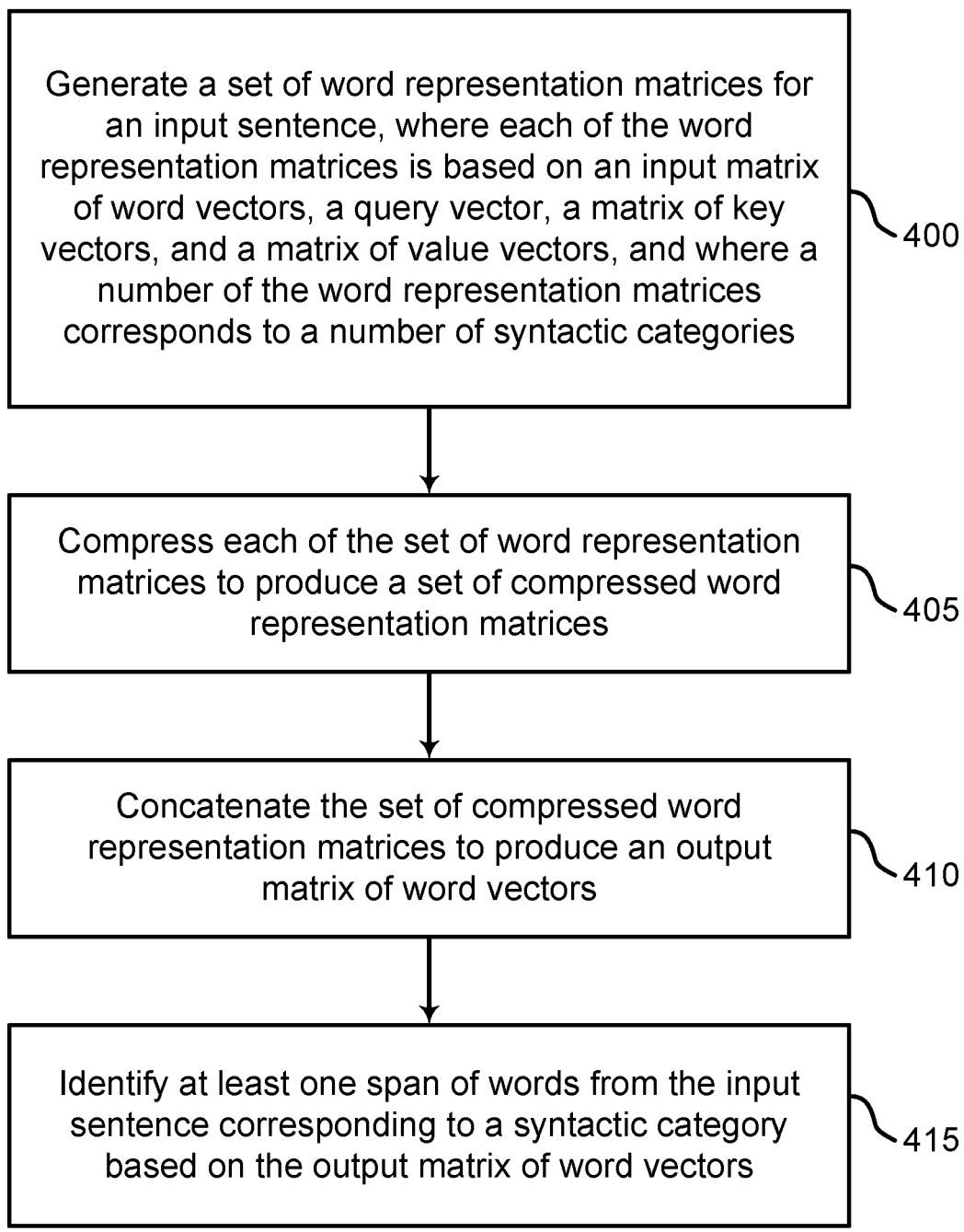
FIG. 4 shows an example of a method for parsing natural language sentences according to aspects of the present disclosure.

FIG. 4 shows an example of a method for parsing natural language sentences according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 400, the system generates a set of word representation matrices for an input sentence, where each of the word representation matrices is based on an input matrix of word vectors, a query vector, a matrix of key vectors, and a matrix of value vectors, and where a number of the word representation matrices is based on a number of syntactic categories. In some cases, the operations of this step may be performed by a word representation sublayer as described with reference to FIGS. 10 and 11.

The label attention architecture uses learned query vectors to represent labels (instead of the query matrices in a self-attention model). That is, the matrix of key vectors may be a product of a label-specific key matrix and the input matrix of word vectors, the matrix of value vectors may be a product of a label-specific value matrix and the input matrix of word vectors, but the query vector may not be a product of the input matrix of word vectors.

At operation 405, the system compresses each of the set of word representation matrices to produce a set of compressed word representation matrices. In some cases, the operations of this step may be performed by a projection sublayer as described with reference to FIGS. 10 and 11.

At operation 410, the system concatenates the set of compressed word representation matrices to produce an output matrix of word vectors. In some cases, the operations of this step may be performed by a concatenation sublayer as described with reference to FIG. 10.

A label attention model may use the concatenation of the outputs of each attention head rather than the matrix projection in self-attention. That is, the output of the label attention layer may be projected at the attention head level, rather than after aggregating outputs, to preserve the source of label-specific information.

At operation 415, the system identifies at least one word from the input sentence corresponding to a syntactic category based on the output matrix of word vectors. In some cases, the operations of this step may be performed by a decoder as described with reference to FIG. 1. In some cases, the decoder may be a CKY-style algorithm, modified to include dependency scores.

Thus, a distinctive feature of a label attention mechanism is the absence of the Query matrix $W^Q$. Instead, labels are represented by a learned matrix Q of query vectors, $q_i$. Corresponding attention weight vectors are calculated for the attention head of label l and an input matrix X of word vectors as seen in Eq. 1:

$$a_l = \text{softmax}\left(\frac{q_l * K_l}{\sqrt{d}}\right), \quad (1)$$

where d is the dimension of query and key vectors, $K_l$ is the matrix of key vectors. Given a learned label-specific key matrix $W_l^K$, $K_l$ is computed as:

$$K_l = W_l^K X \quad (2)$$

Each attention head in the label attention layer has an attention vector. A single vector (e.g., a context vector) that contains label-specific context information may be obtained rather than a matrix of vectors. The context vector is an attention-weighted sum of value vectors and represents the input sentence as viewed by the label. The context vector $c_l$ of the label 1 is computed as follows:

$$c_l = a_l * V_l, \quad (3)$$

where $a_l$ is the vector of attention weights in Eq. 1, and $V_l$ is the matrix of value vectors.

Given a learned label-specific value matrix $W_l^V$, $V_l$ is computed as:

$$V_l = W_l^V X. \quad (4)$$

The context vector is added to each input vector. A resulting matrix of word vectors (i.e., the word representation matrix) is projected to a lower dimension before normalizing. The word vectors computed by each label attention head are then distributed. In other words, the compressed matrix of word vectors includes a number of word vectors corresponding to the number of words in the input text. The label for each word is determined based on the individual word vectors from each attention head.

That is, the label attention layer may contain one attention head per label. The values from each label are identifiable within the final word representation. Activation functions of a position-wise feed-forward layer may create challenges when following the path of the contributions. Therefore, to compute the contributions from each label, the position-wise feed-forward layer can be removed. Contributions may be computed using normalization and averaging. In an example scenario, the contributions of each label are represented in a span vector.

In some cases, forward and backward representations may be formed by splitting each label-specific word vector in the middle. Averaging may be used for computing contributions. Other functions, such as softmax, can be used to compute contributions. An additional process for interpreting predictions may include label-to-word attention distributions.

For constituency parsing, span representations may be used. For a span starting at the i-th word and ending at the j-th word, the corresponding span vector $s_{ij}$ is computed as:

$$s_{ij} = [\vec{h}_j - \vec{h}_{i-1}; \overleftarrow{h}_{i+1} - \overleftarrow{h}_i], \quad (5)$$

where $\overleftarrow{h}_i$ and $\vec{h}_i$ are respectively the backward and forward representation of the i-th word obtained by splitting its representation in half. The score vector for the span is obtained by applying a one-layer feed-forward layer, shown in Eq. 6:

$$S(i,j) = W_2 \text{ReLU}(\text{LN}(W_1 s_{ij} + b_1)) + b_2, \quad (6)$$

where LN is Layer Normalization, and $W_1$, $W_2$, $b_1$, and $b_2$ are learned parameters. For the l-th syntactic category, the corresponding score s(i,j,l) is then the l-th value in the S(i,j) vector. Consequently, the score of a constituency parse tree T is the sum of the scores of the spans and the spans syntactic categories:

$$s(T) = \Sigma_{(i,j,l) \in T} s(i,j,l) \quad (7)$$

A CKY-style algorithm may then be used to find the highest scoring tree $\hat{T}$. The model is trained to find the correct parse tree T*, such that for trees T, the following margin constraint is satisfied:

$$s(T^*) \geq s(T) + \Delta(T,T^*), \quad (8)$$

where $\Delta$ is the Hamming loss on labeled spans. The corresponding loss function is the hinge loss:

$$L_c = \max(o, \max_T[s(T) + \Delta(T,T^*)] - s(T^*)) \quad (9)$$

For dependency parsing, a biaffine attention mechanism may be used to compute a probability distribution for the dependency head of each word. The child-parent score $\alpha_{ij}$ for the j-th word to be the head of the i-th word is:

$$\alpha_{ij} = h_i^{(d)T} W h_j^{(h)} + U^T h_i^{(d)} + V^T h_j^{(h)} + b, \quad (10)$$

where $h_i^{(d)}$ is the dependent representation of the i-th word obtained by putting its representation h; through a one-layer perceptron. Likewise, $h_j$(h) the head representation of the j-th word obtained by putting its representation $h_j$ through a separate one-layer perceptron. The matrices W, U, and V are learned parameters.

Figure 5:
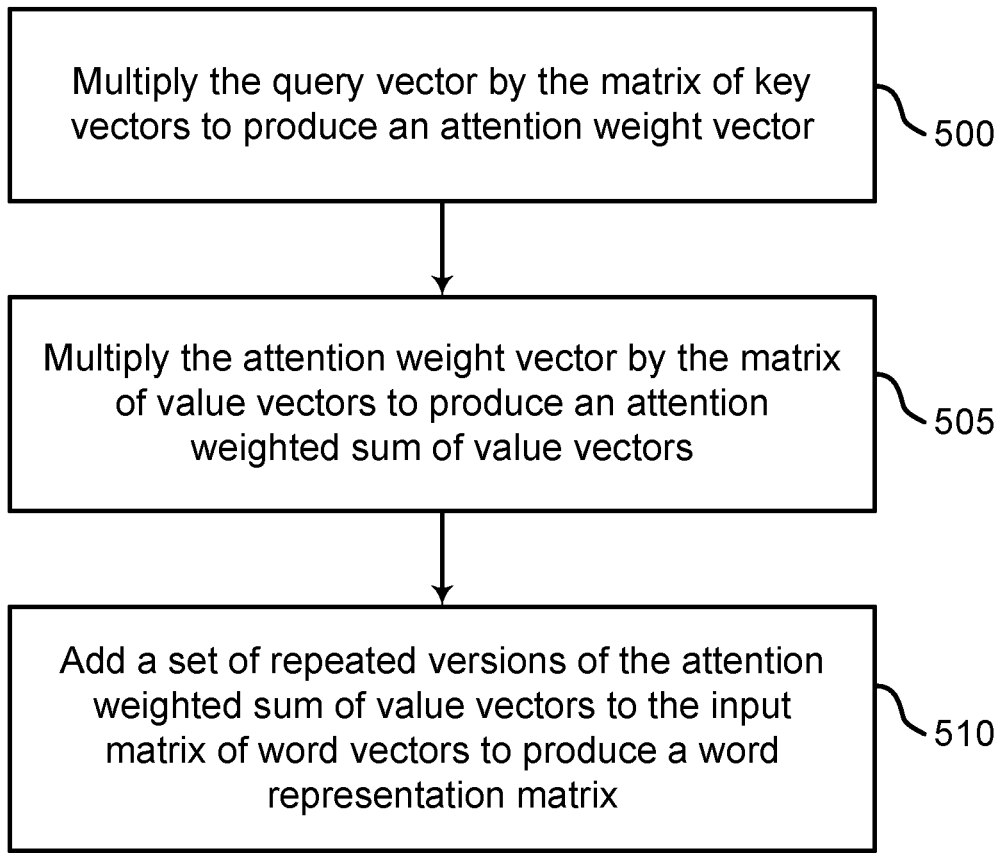
FIG. 5 shows an example of a method for generating a word representation matrix according to aspects of the present disclosure.

FIG. 5 shows an example of a method for generating a word representation matrix according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 500, the system multiplies the query vector by the matrix of key vectors to produce an attention weight vector (i.e., $a_i=q_1*K_i$). In some cases, the operations of this step may be performed by a query sublayer as described with reference to FIGS. 10 and 11.

At operation 505, the system multiplies the attention weight vector by the matrix of value vectors to produce a context vector (i.e., $c_i=a_i*V_i$). In some cases, the operations of this step may be performed by an attention sublayer as described with reference to FIGS. 10 and 11.

At operation 510, the system adds a set of repeated versions of the context vector, $c_i$, to the input matrix of word vectors, X, to produce a word representation matrix. In some cases, the operations of this step may be performed by a word representation sublayer as described with reference to FIGS. 10 and 11.

Figure 6:
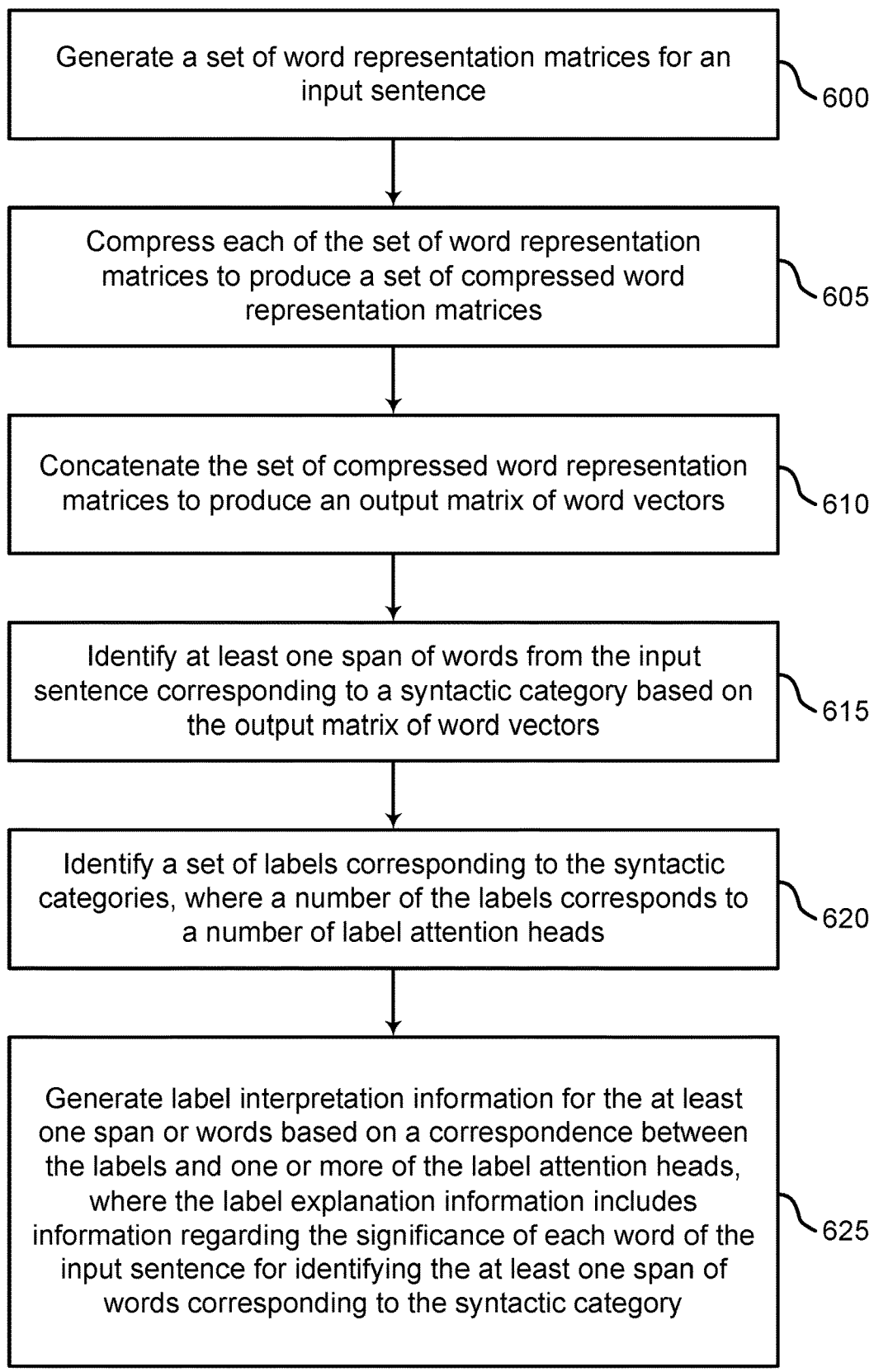
FIG. 6 shows an example of a method for generating label interpretation information according to aspects of the present disclosure.

FIG. 6 shows an example of a method for generating label interpretation information according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

Steps 600 through 615 may correspond to steps 400 through 415 described with reference to FIG. 4, and further description is not included for these steps. At operation 600, the system generates a set of word representation matrices for an input sentence. At operation 605, the system compresses each of the set of word representation matrices to produce a set of compressed word representation matrices. At operation 610, the system concatenates the set of compressed word representation matrices to produce an output matrix of word vectors. At operation 615, the system identifies at least one word from the input sentence corresponding to a syntactic category based on the output matrix of word vectors.

At operation 620, the system identifies a set of labels corresponding to the syntactic categories, where a number of the labels is based on a number of label attention heads. In some cases, the operations of this step may be performed by an encoder as described with reference to FIGS. 1 and 8.

At operation 625, the system generates label interpretation information for the at least one span or words based on a correspondence between the labels and one or more of the label attention heads, where the label interpretation information includes information regarding the significance of each word of the input sentence for identifying the at least one span of words corresponding to the syntactic category. In some cases, the operations of this step may be performed by an interpreter as described with reference to FIGS. 1 and 13.

In one embodiment, the interpreter 125 collects span vectors are and sorts them by predicted syntactic categories to identify which attention heads contribute to labels. For each predicted syntactic category, the head contributions for each span vector is computed and an average is calculated for the contributions by each head. These may be represented in a bar chart. Common syntactic categories are Noun Phrases (NP), Verb Phrases (VP) and Sentences (S). Each bar chart may have peaks for different heads. Therefore, in some examples predictions for these labels are explained by contributions from several label attention heads, rather than just one.

Figure 7:
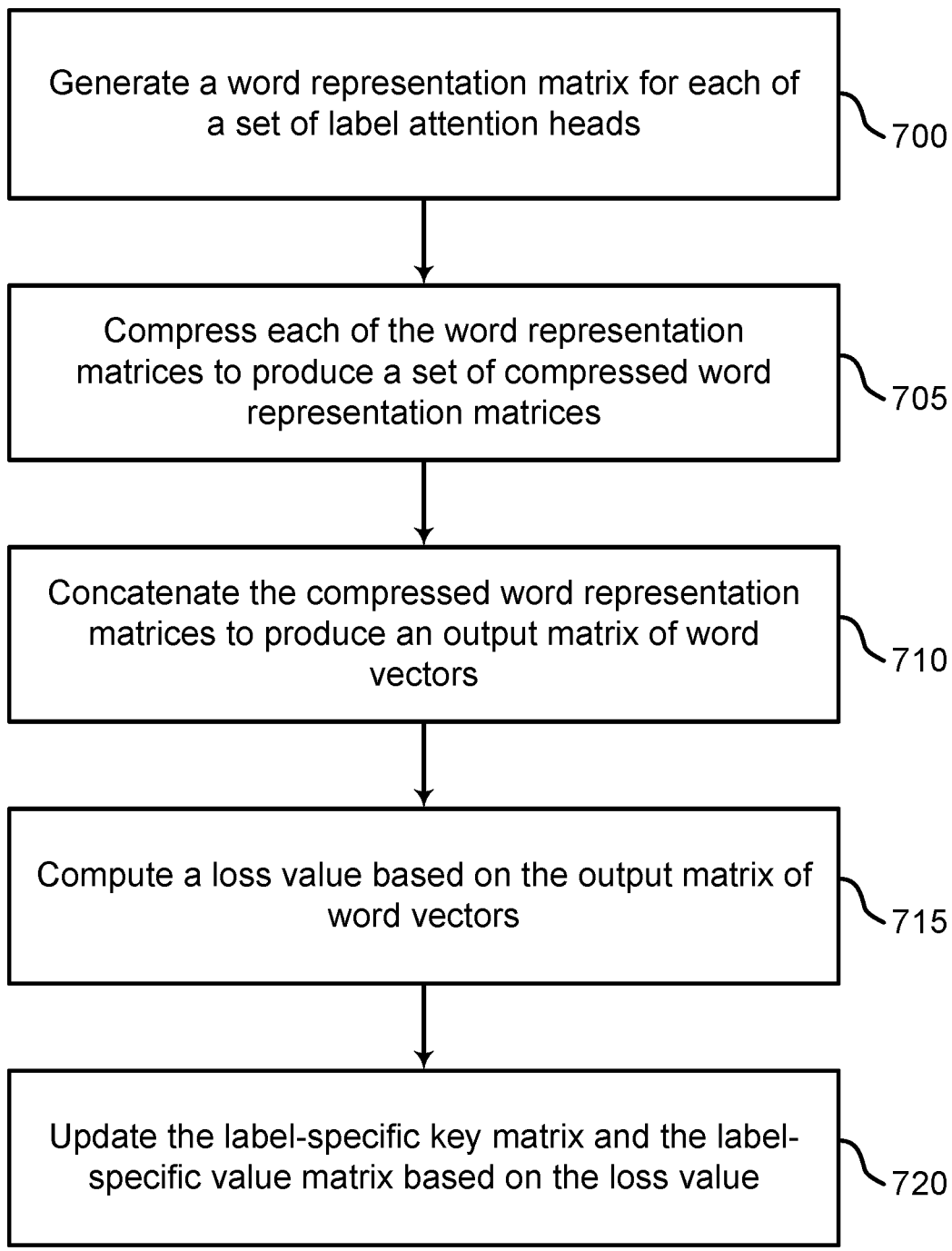
FIG. 7 shows an example of a method for training an NLP model according to aspects of the present disclosure.

FIG. 7 shows an example of a method for training an NLP model according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 700, the system generates a word representation matrix for each of a set of label attention heads, where each of the word representation matrices is based on an input matrix of word vectors, a query vector, a label-specific key matrix, and a label-specific value matrix, and where a number of the label attention heads is based on a number of syntactic categories. In some cases, the operations of this step may be performed by an encoder as described with reference to FIGS. 1 and 8.

At operation 705, the system compresses each of the word representation matrices to produce a set of compressed word representation matrices. In some cases, the operations of this step may be performed by a projection sublayer as described with reference to FIGS. 10 and 11.

At operation 710, the system concatenates the compressed word representation matrices to produce an output matrix of word vectors. In some cases, the operations of this step may be performed by a concatenation sublayer as described with reference to FIG. 10.

At operation 715, the system computes a loss value based on the output matrix of word vectors. In some cases, the operations of this step may be performed by a training component as described with reference to FIG. 1.

In one embodiment, the label attention model may train dependency parsing by minimizing the negative likelihood of the correct dependency tree. The loss function may be based on cross-entropy:

$$L_d=-\log(P(h_i|d_i)P(l_i|d_i,h_i)),$$

where $h_i$ is the correct head for dependent $d_i$, $P(h_i|d_i)$ is the probability that $h_i$ is the head of $d_i$, and $P(l_i|d_i, h_i)$ is the probability of the correct dependency label $l_i$ for the child-parent pair $(d_i, h_i)$.

In some cases, the label attention model jointly trains on constituency and dependency parsing by minimizing the sum of the constituency and dependency losses:

$$L=L_c+L_d \qquad (12)$$

At operation 720, the system updates the label-specific key matrix and the label-specific value matrix based on the loss value. In some cases, the operations of this step may be performed by a training component as described with reference to FIG. 1.

Label Attention Architecture

Figure 8:
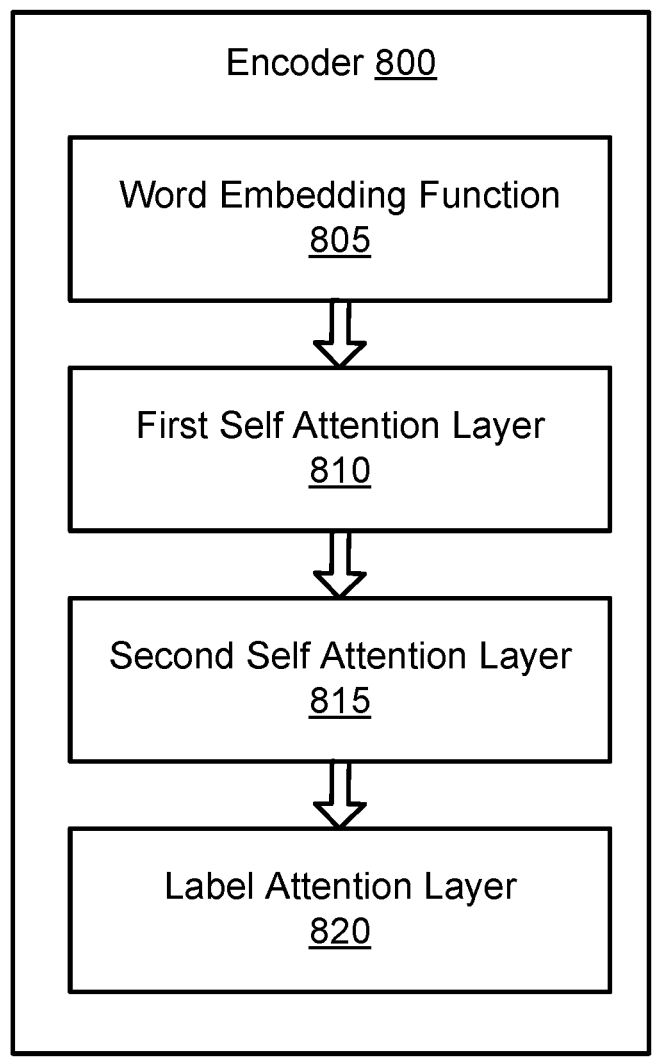
FIG. 8 shows an example of an encoder according to aspects of the present disclosure.

FIG. 8 shows an example of an encoder 800 according to aspects of the present disclosure. Encoder 800 may be an example of, or include aspects of, the corresponding element described with reference to FIG. 1. Encoder 800 may include word embedding function 805, first self-attention layer 810, second self-attention layer 815, and label attention layer 820. The encoder illustrated in FIG. 8 is just one example. In another embodiment, a label attention model may have three or more self-attention layers. In some embodiments, the word embedding function 805 may be separate from the encoder 800.

Word embedding function 805 may be configured to produce the input matrix of word vectors. That is, word embedding function 805 may embed the input sentence in an embedding space. In some examples, the word embedding function 805 includes an XLNet word embedding algorithm. In some embodiments, word representations may include a concatenation of content and position embeddings. Content embeddings may include a sum of word and the part-of-speech embeddings.

Self-attention layers 810 and 815 are examples of layers that may be included in a label attention model to process an input matrix prior to the label attention layer 820. Label attention layer 820 may be an example of, or include aspects of, the corresponding element described with reference to FIG. 9, and may operate in accordance with the operations described with reference to FIGS. 4-7.

Figure 9:
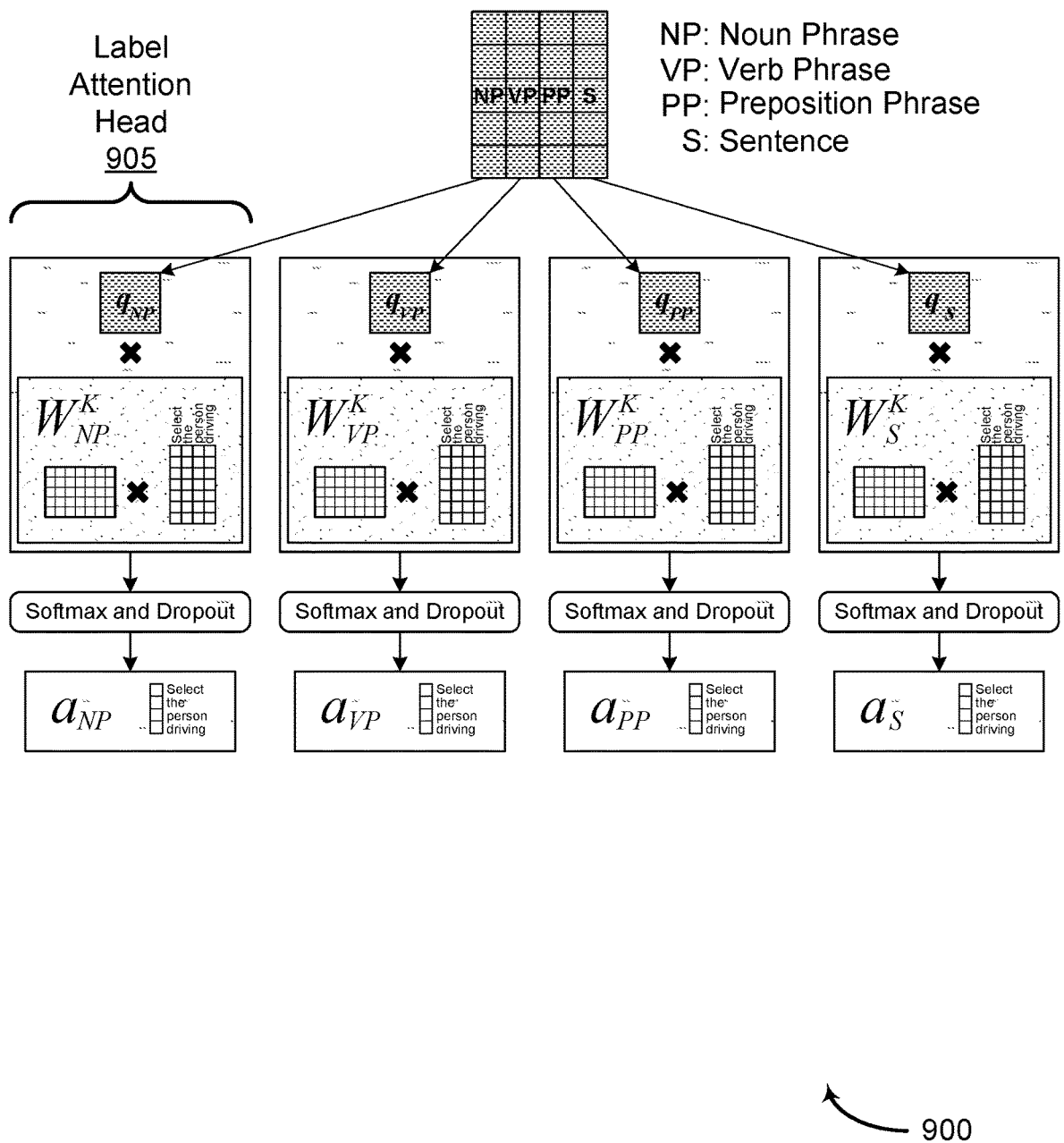
FIG. 9 shows an example of label attention layer according to aspects of the present disclosure.

FIG. 9 shows an example of label attention layer 900 according to aspects of the present disclosure. Label attention layer 900 may be an example of, or include aspects of, the corresponding element or elements described with reference to FIG. 8. FIG. 9 illustrates an example in which learned query vectors, $q_l$, corresponding to various syntactic category labels (i.e., noun phrase or verb phrase) are used to generate attention vectors, $a_l$, for each label attention head. For simplicity, some components of each label attention head 905 are omitted from FIG. 9, and are shown in more detail with reference to FIGS. 10 and 11.

Label attention layer 900 may include multiple label attention heads 905. In one embodiment, and a label attention layer 900 may include 112 attention heads corresponding to different syntactic category labels. FIG. 9 illustrates an example that includes a softmax and dropout function, but these steps may be omitted or replaced. Label attention heads 905 may be an example of, or include aspects of, the corresponding element or elements described with reference to FIGS. 10 and 11. In some examples, the label attention layer includes a softmax function and a dropout function.

Figure 10:
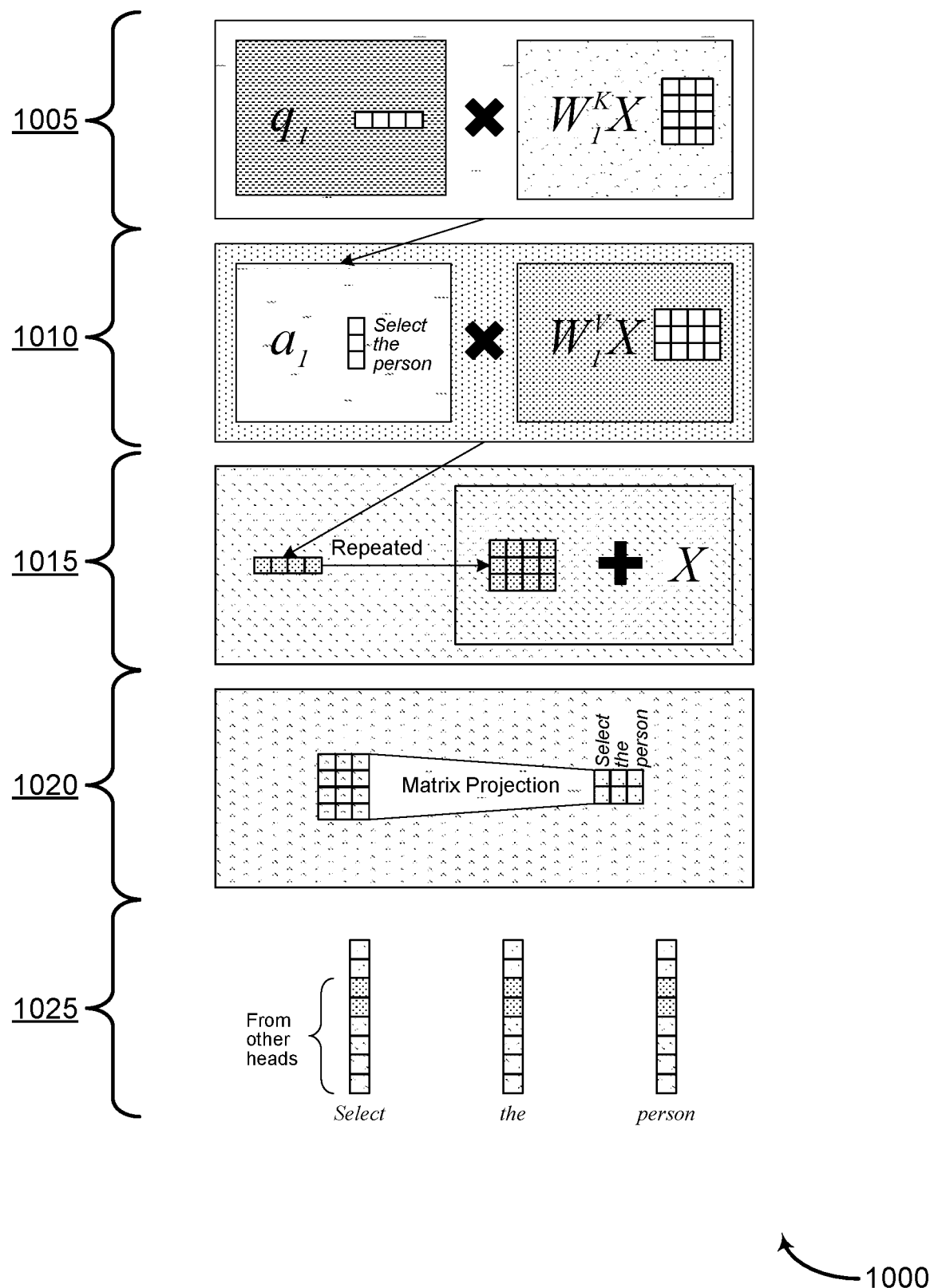
FIG. 10 shows an example of a label attention head according to aspects of the present disclosure.

FIG. 10 shows an example of a label attention head 1000 according to aspects of the present disclosure. Label attention head 1000 may be an example of, or include aspects of, the corresponding element or elements described with reference to FIGS. 9 and 11.

Label attention head 1000 may correspond to a syntactic category and may include query sublayer 1005, attention sublayer 1010, word representation sublayer 1015, projection sublayer 1020, and concatenation sublayer 1025.

Query sublayer 1005 may multiply the query vector, $q_1$, by the matrix of key vectors, $K_l$, to produce an attention weight vector, $a_l$. Additionally, query sublayer 1005 may multiply the learned label-specific key matrix, $W_l^K$, and the input matrix of word vectors, X, to produce a matrix of key vectors, $K_l$. The learned label-specific key matrix, $W_l^K$, may comprise parameters learned during the training process. Query sublayer 1005 may be an example of, or include aspects of, the corresponding element or elements described with reference to FIG. 11.

Attention sublayer 1010 may multiply the attention weight vector, $a_l$, by the matrix of value vectors, $V_l$, to produce a context vector, $c_l$. Attention sublayer 1010 may also multiply the label-specific value matrix, $W_l^V$, and the input matrix of word vectors, X, to produce the matrix of value vectors, $V_l$. The label-specific value matrix, $W_l^V$, may comprise parameters learned during the training process. Attention sublayer 1010 may be an example of, or include aspects of, the corresponding element or elements described with reference to FIG. 11.

Word representation sublayer 1015 may generate a set of word representation matrices for an input sentence, where each of the word representation matrices is based on an input matrix of word vectors, a query vector, a matrix of key vectors, and a matrix of value vectors, and where the number of the word representation matrices is based on the number of syntactic categories.

Figure 11:
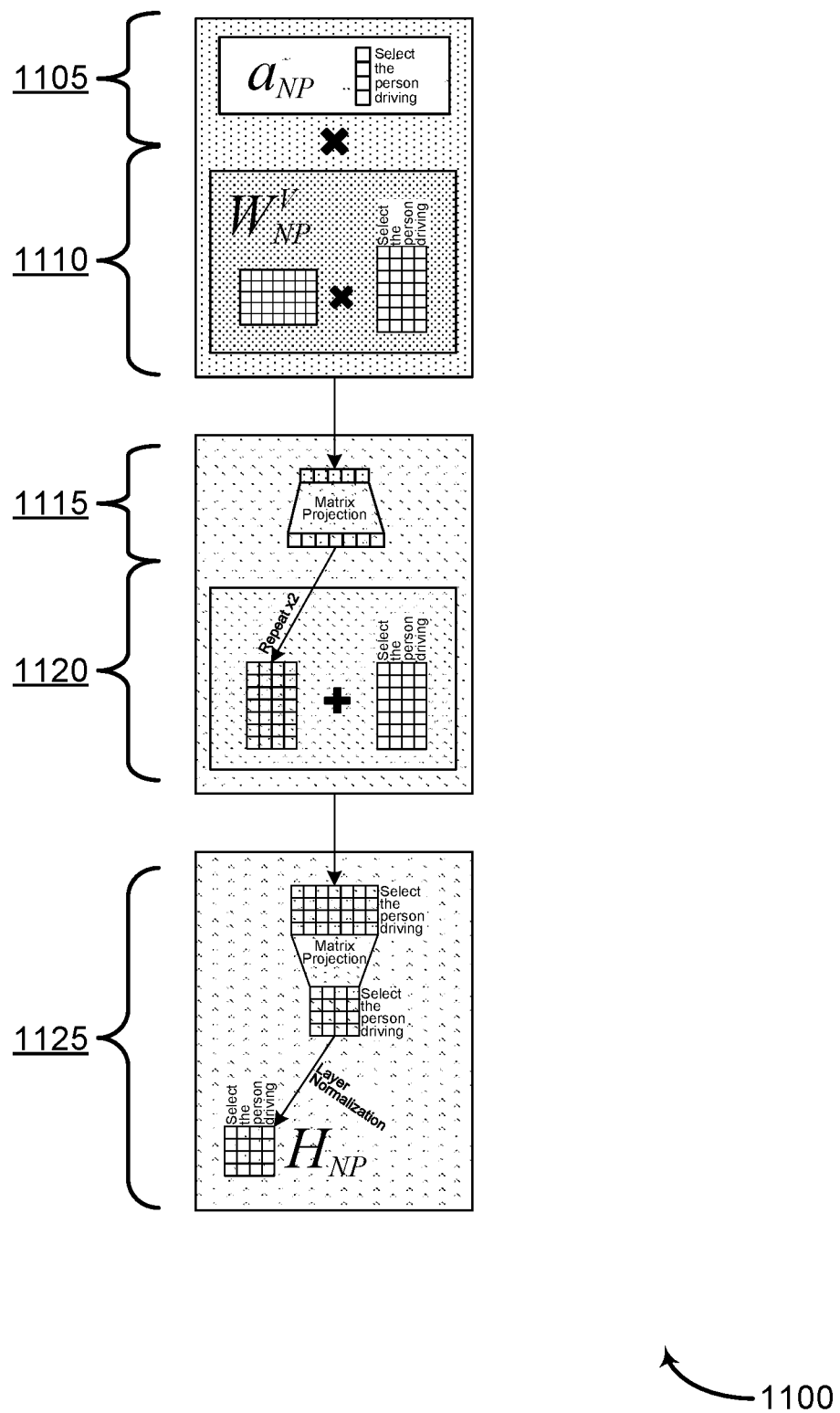
FIG. 11 shows an example of an additional matrix projection according to aspects of the present disclosure.

For example, word representation sublayer 1015 may add a set of repeated versions of the context vector, $c_l$, to the input matrix of word vectors, X, to produce a word representation matrix. In some examples, word representation sublayer 1015 may also project the context vector into a different number of dimensions (as illustrated in FIG. 11). Word representation sublayer 1015 may be an example of, or include aspects of, the corresponding element or elements described with reference to FIG. 11.

Projection sublayer 1020 may compress each of the set of word representation matrices to produce a set of compressed word representation matrices (i.e., word representation matrices having fewer dimensions than the input matrix, X). For example, the projection may happen based on a neural network that learns to capture the information from the word representation matrices in a reduced number of dimensions. Additionally or alternatively, the compression may utilize algorithmic row or column grouping techniques that take advantage of correlations between the values in different rows or columns. Projection sublayer 1020 may be an example of, or include aspects of, the corresponding element or elements described with reference to FIG. 11.

Concatenation sublayer 1025 may concatenate the set of compressed word representation matrices to produce an output matrix of word vectors. For example, the compressed word representation matrices may be concatenated such that the columns of the compressed word representation matrices may join to form the columns of the output matrix of word vectors, or by row such that rows of the compressed word representation matrices are joined to form each row of the output matrix. The word representation matrices may be combined in a way that enables the contributions of each label attention head to be separately determined.

FIG. 11 shows an example of an additional matrix projection 1115 according to aspects of the present disclosure. Specifically, FIG. 11 illustrates how the context vectors, $c_l$, may be processed using additional matrix projection 1115.

Label attention head 1100 may be an example of, or include aspects of, the corresponding element or elements described with reference to FIGS. 9 and 10. Label attention head 1100 may include query sublayer 1105, attention sublayer 1110, additional matrix projection 1115, word representation sublayer 1120, and projection sublayer 1125. Query sublayer, attention sublayer 1110, word representation sublayer 1120, and projection sublayer 1125 may be an example of, or include aspects of, the corresponding element or elements described with reference to FIG. 10.

Figure 12:
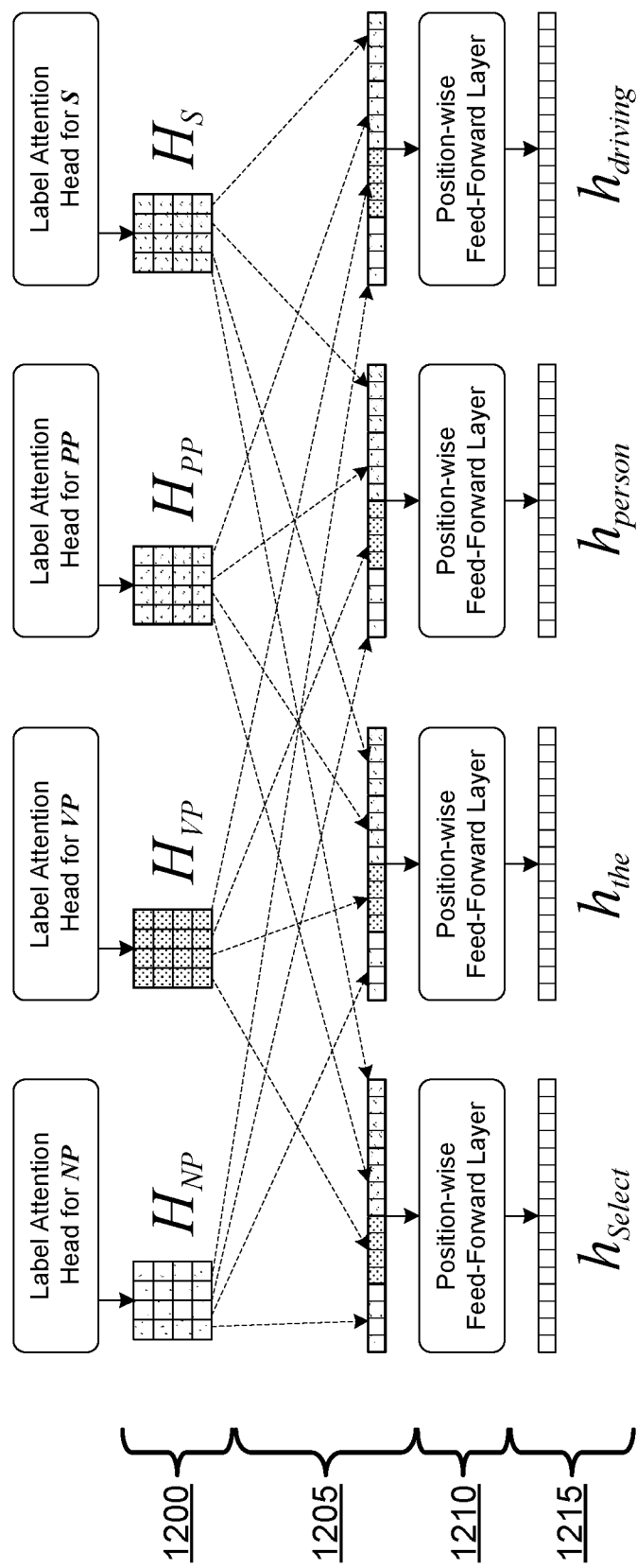
FIG. 12 shows an example of a feed forward layer according to aspects of the present disclosure.

FIG. 12 shows an example of a feed forward layer according to aspects of the present disclosure. The example shown includes word representations 1200, concatenation 1205, feed forward layer (FFL) 1210, and word vectors 1215. As illustrated in FIG. 12, certain embodiments of the present disclosure may include a feed forward layer that process the word vectors 1215. However, in some cases, processing the word vectors with a feed forward layer may interfere with the interpretation of the label attention heads.

Figure 13:
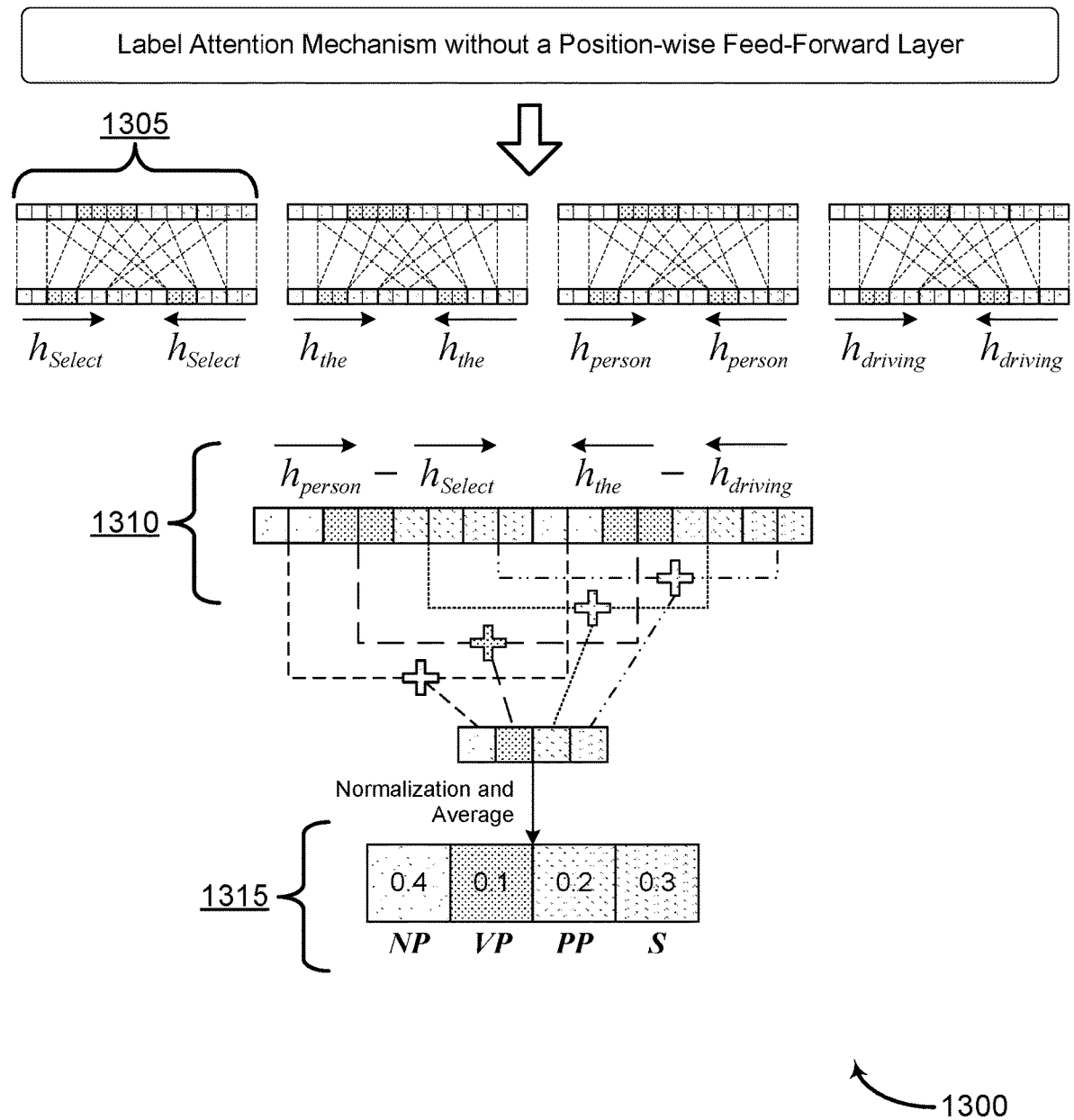
FIG. 13 shows an example of an interpreter according to aspects of the present disclosure.

Therefore, as shown in FIG. 13, some embodiments of the present disclosure do not include a feed forward layer.

FIG. 13 shows an example of a label attention layer without a feed forward layer according to aspects of the present disclosure. Label attention layer 1300 may be an example of, or include aspects of, the corresponding element or elements described with reference to FIG. 9.

As shown in FIG. 13, after the word representation matrices for each label attention head are concatenated, a word vector 1305 for each word in an input sentence may be identified from the concatenated word representation matrix. That is, the concatenated word representation matrix can be interpreted as including a word vector for each word.

For any given span of words 1310 the values from the individual word matrices for each label attention head may be combined (i.e., normalized and averaged) to produce a single value for each syntactic label. Based on these values, it can be determined whether that span of words corresponds to a particular label as described above with reference to FIG. 4. In some cases, forward and backward representations may be formed by splitting each label-specific word vector in the middle. Other functions, such as softmax, can also be used to compute contributions.

Accordingly, the present disclosure includes the following embodiments.

A method for parsing natural language sentences using an artificial neural network (ANN) is described. Embodiments of the method may generating a plurality of word representation matrices for an input sentence, wherein each of the word representation matrices is based on an input matrix of word vectors, a query vector, a matrix of key vectors, and a matrix of value vectors, and wherein a number of the word representation matrices is based on a number of syntactic categories, compressing each of the plurality of word representation matrices to produce a plurality of compressed word representation matrices, concatenating the plurality of compressed word representation matrices to produce an output matrix of word vectors, and identifying at least one word from the input sentence corresponding to a syntactic category based on the output matrix of word vectors.

Some examples of the method described above may further include multiply the query vector by the matrix of key vectors to produce an attention weight vector. Some examples may further include multiply the attention weight vector by the matrix of value vectors to produce a context vector. Some examples may further include adding a plurality of repeated versions of the context vector to the input matrix of word vectors to produce a word representation matrix.

Some examples of the method described above may further include projecting the context vector into a different number of dimensions, wherein the repeated versions of the context vector are based on the projection.

Some examples of the method described above may further include identifying a plurality of labels corresponding to the syntactic categories, wherein a number of the labels is based on a number of label attention heads. Some examples may further include generating label interpretation information for the at least one span or words based on a correspondence between the labels and one or more of the label attention heads, wherein the label interpretation information includes information regarding the significance of each word of the input sentence for identifying the at least one span of words corresponding to the syntactic category.

In some examples, the matrix of key vectors is a product of a label-specific key matrix and the input matrix of word vectors, the matrix of value vectors is a product of a label-specific value matrix and the input matrix of word vectors, and the query vector is not a product of the input matrix of word vectors.

A system for parsing natural language sentences using an ANN is described. Embodiments of the system may an encoder including a label attention layer configured to produce an output matrix of word vectors based on an input matrix of word vectors using a number of label attention heads corresponding to a number of syntactic categories, wherein each of the label attention heads produces a word representation matrix based on the input matrix of word vectors, a query vector, a matrix of key vectors, and a matrix of value vectors and a decoder configured to identify at least one span of words of an input sentence corresponding to a syntactic category based on the output matrix of word vectors.

Some examples of the system described above may further include an interpreter configured to generate label interpretation information based on a correspondence between the syntactic categories and the label attention heads.

Some examples of the system described above may further include a query sublayer configured to multiply the query vector by a matrix of key vectors to produce an attention weight vector. Some examples may further include an attention sublayer configured to the attention weight vector by a matrix of value vectors to produce a context vector. Some examples may further include a word representation sublayer configured to add a plurality of repeated versions the context vector to an input matrix of word vectors to produce a word representation matrix. Some examples may further include a projection sublayer configured to compress the word representation matrix to produce a compressed word representation matrix. Some examples may further include a concatenation sublayer configured to concatenate the compressed word representation matrices to produce the output matrix of word vectors.

In some examples, the encoder includes a plurality of layers, wherein an output of each layer prior to a final layer is provided as an input for a subsequent layer, and wherein the label attention layer includes the final layer. In some examples, the label attention layer includes a softmax function and a dropout function.

Some examples of the system described above may further include a word embedding function configured to produce the input matrix of word vectors. In some examples, the word embedding function includes an XLNet word embedding algorithm. In some examples, the decoder includes a softmax function. In some examples, the decoder includes a CKY decoder.

A method for parsing natural language sentences using an ANN is described. Embodiments of the method may generating a word representation matrix for each of a plurality of label attention heads, wherein each of the word representation matrices is based on an input matrix of word vectors, a query vector, a label-specific key matrix, and a label-specific value matrix, and wherein a number of the label attention heads is based on a number of syntactic categories, compressing each of the word representation matrices to produce a plurality of compressed word representation matrices, concatenating the compressed word representation matrices to produce an output matrix of word vectors, computing a loss value based at least in part on the output matrix of word vectors, and updating the label-specific key matrix and the label-specific value matrix based on the loss value.

Some examples of the method described above may further include multiply the label-specific key matrix and the input matrix of word vectors to produce a matrix of key vectors. Some examples may further include multiply the label-specific value matrix and the input matrix of word vectors to produce the matrix of value vectors.

Some examples of the method described above may further include multiply the query vector by the matrix of key vectors to produce an attention weight vector. Some examples may further include multiply the attention weight vector by the matrix of value vectors to produce a context vector. Some examples may further include adding a plurality of repeated versions of the context vector to the input matrix of word vectors to produce a word representation matrix.

Some examples of the method described above may further include projecting the context vector into a different number of dimensions, wherein the repeated versions of the context vector are based on the projection. Some examples of the method described above may further include identifying an input sentence, embedding the input sentence in an embedding space, and applying at least one self-attention layer to the embedded input sentence to produce the input matrix of word vectors. Some examples of the method described above may further include apply a softmax function and a dropout function, wherein the loss value is computed based on the softmax function and the dropout function.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for natural language processing, comprising:
identifying a query matrix comprising a plurality of query vectors, wherein each of the query vectors corresponds to a different syntactic category from a plurality of syntactic categories;
generating a plurality of word representation matrices for an input sentence using an attention network comprising a plurality of attention heads corresponding to the plurality of syntactic categories, wherein each of the word representation matrices is generated by a different attention head of the plurality of attention heads based on a corresponding query vector of the plurality of query vectors;
identifying at least one word from the input sentence corresponding to a syntactic category based on the plurality of word representation matrices; and
generating annotation information for the input sentence based on identifying the at least one word corresponding to the syntactic category.

2. The method of claim 1, further comprising:
compressing each of the plurality of word representation matrices to produce a plurality of compressed word representation matrices.

3. The method of claim 1, further comprising:
identifying a plurality of labels corresponding to the syntactic categories, wherein a number of the labels is based on a number of label attention heads; and
generating label interpretation information for at least one span of words based on a correspondence between the labels and one or more of the label attention heads, wherein the label interpretation information comprises information regarding a significance of each word of the input sentence for identifying the at least one span of words corresponding to a syntactic category.

4. The method of claim 1, wherein:
the query vector is not a product of the input matrix of word vectors.

5. The method of claim 1, further comprising:
multiply a query vector by a matrix of key vectors to produce an attention weight vector;

multiply the attention weight vector by a matrix of value vectors to produce a context vector; and adding a plurality of repeated versions of the context vector to an input matrix of word vectors to produce a word representation matrix.

6. The method of claim 5, further comprising:

projecting the context vector into a different number of dimensions, wherein the repeated versions of the context vector are based on the projection.

7. A system for natural language processing, comprising:

an encoder comprising a label attention layer configured to identify a query matrix comprising a plurality of query vectors, wherein each of the query vectors corresponds to a different syntactic category from a plurality of syntactic categories, and produce an output matrix of word vectors based on a query vector of the plurality of query vectors using a plurality of label attention heads corresponding to a number of syntactic categories, wherein each of the label attention heads produces a word representation matrix based on a corresponding query vector of the plurality of query vectors; and a decoder configured to identify at least one span of words of an input sentence corresponding to a syntactic category based on the plurality of word representation matrices.

8. The system of claim 7, further comprising:

an interpreter configured to generate label interpretation information based on a correspondence between the syntactic categories and the label attention heads.

9. The system of claim 7, further comprising:

a query sublayer configured to multiply the query vector by a matrix of key vectors to produce an attention weight vector;

an attention sublayer configured to multiply the attention weight vector by a matrix of value vectors to produce a context vector;

a word representation sublayer configured to add a plurality of repeated versions the context vector to an input matrix of word vectors to produce a word representation matrix;

a projection sublayer configured to compress the word representation matrix to produce a compressed word representation matrix; and a concatenation sublayer configured to concatenate the compressed word representation matrices to produce the output matrix of word vectors.

10. The system of claim 7, wherein:

the encoder comprises a plurality of layers, wherein an output of each layer prior to a final layer is provided as an input for a subsequent layer, and wherein the label attention layer comprises the final layer.

11. The system of claim 7, wherein:

the decoder comprises a softmax function.

12. The system of claim 7, wherein:

the decoder comprises a CKY decoder.

13. The system of claim 7, further comprising:

a word embedding function configured to produce an input matrix of word vectors.

14. The system of claim 13, wherein:

the word embedding function comprises an XLNet word embedding algorithm.

15. A method for training natural language processing model, comprising:

identifying a query matrix comprising a plurality of query vectors, wherein each of the query vectors corresponds to a different syntactic category from a plurality of syntactic categories;

generating a word representation matrix for each of a plurality of label attention heads, wherein each of the word representation matrices is based on an input matrix of word vectors, a corresponding query vector of the plurality of query vectors, a label-specific key matrix, and a label-specific value matrix, and wherein a number of the label attention heads is based on a number of syntactic categories;

compressing each of the word representation matrices to produce a plurality of compressed word representation matrices;

concatenating the compressed word representation matrices to produce an output matrix of word vectors;

computing a loss value based at least in part on the output matrix of word vectors; and updating the label-specific key matrix and the label-specific value matrix based on the loss value.

16. The method of claim 15, further comprising:

identifying an input sentence;

embedding the input sentence in an embedding space; and applying at least one self-attention layer to the embedded input sentence to produce the input matrix of word vectors.

17. The method of claim 15, further comprising:

applying a softmax function and a dropout function, wherein the loss value is computed based on the softmax function and the dropout function.

18. The method of claim 15, further comprising:

multiply the label-specific key matrix and the input matrix of word vectors to produce a matrix of key vectors; and multiply the label-specific value matrix and the input matrix of word vectors to produce a matrix of value vectors.

19. The method of claim 18, further comprising:

multiply the query vector by the matrix of key vectors to produce an attention weight vector;

multiply the attention weight vector by the matrix of value vectors to produce a context vector; and adding a plurality of repeated versions of the context vector to the input matrix of word vectors to produce the word representation matrix.

20. The method of claim 19, further comprising:

projecting the context vector into a different number of dimensions, wherein the repeated versions of the context vector are based on the projection.

* * * * *